United States Patent [19]

Kossebau

[11] 4,390,090
[45] Jun. 28, 1983

[54] METHOD AND APPARATUS FOR DUST FREE GRAIN LOADING

[75] Inventor: Friedrich K. O. Kossebau, Braunschweig, Fed. Rep. of Germany

[73] Assignee: Gebrueder Buehler AG, Uzwil, Switzerland

[21] Appl. No.: 207,895

[22] Filed: Nov. 18, 1980

Related U.S. Application Data

[63] Continuation of Ser. No. 17,927, Mar. 6, 1979, abandoned.

[51] Int. Cl.³ .............................................. B65G 11/20
[52] U.S. Cl. ....................................... 193/32; 222/564
[58] Field of Search ................. 193/2 R, 2 D, 2 C, 4, 193/9, 32, 3, 20, 21, 33, 34; 414/291, 293; 222/564, 545, 547

[56] References Cited

U.S. PATENT DOCUMENTS

| 57,550 | 1/1897 | Mathews | 193/32 X |
|---|---|---|---|
| 842,345 | 1/1907 | Scott | 222/545 X |
| 2,120,506 | 6/1938 | O'Rourke et al. | 193/32 |
| 2,634,842 | 4/1953 | Caylor | 193/32 |
| 2,733,800 | 2/1956 | Fenske | 193/27 |
| 3,485,420 | 12/1969 | Lucas | 222/564 |
| 3,739,893 | 6/1973 | Kaufman | 193/17 |

FOREIGN PATENT DOCUMENTS

| 1082853 | 11/1958 | Fed. Rep. of Germany | 193/2 R |
|---|---|---|---|
| 7135192 | 3/1973 | Fed. Rep. of Germany | 193/2 R |
| 2627535 | 12/1977 | Fed. Rep. of Germany | 193/2 R |
| 2713432 | 9/1978 | Fed. Rep. of Germany | 193/27 |

OTHER PUBLICATIONS

Redwing Grain Nozzle, Baily-Parks Urethane Inc., publication.
Midwest Dust Free Loading-publication.

*Primary Examiner*—John J. Love
*Assistant Examiner*—Gene A. Church
*Attorney, Agent, or Firm*—Merchant, Gould, Smith, Edell, Welter & Schmidt

[57] ABSTRACT

The grain loading apparatus 2 comprises the housing 4 which is attached to the end of the grain discharge chute. The housing 4 includes a shutoff valve 12 located proximately to a material outlet opening 9. The shutoff valve 12 exerts an adjustable closure force on the material flow through the outlet opening 9 to build up a first column of material thereabove. In addition, a grain retarding cone and cylinder 92 is arranged inside the housing 4 above the shutoff valve 12. This grain retarding cone and cylinder 92 decreases the kinetic energy of the material flow and builds up a second column of material thereabove to significantly lessen release of dust into the air upon discharge of the grain strain.

3 Claims, 9 Drawing Figures

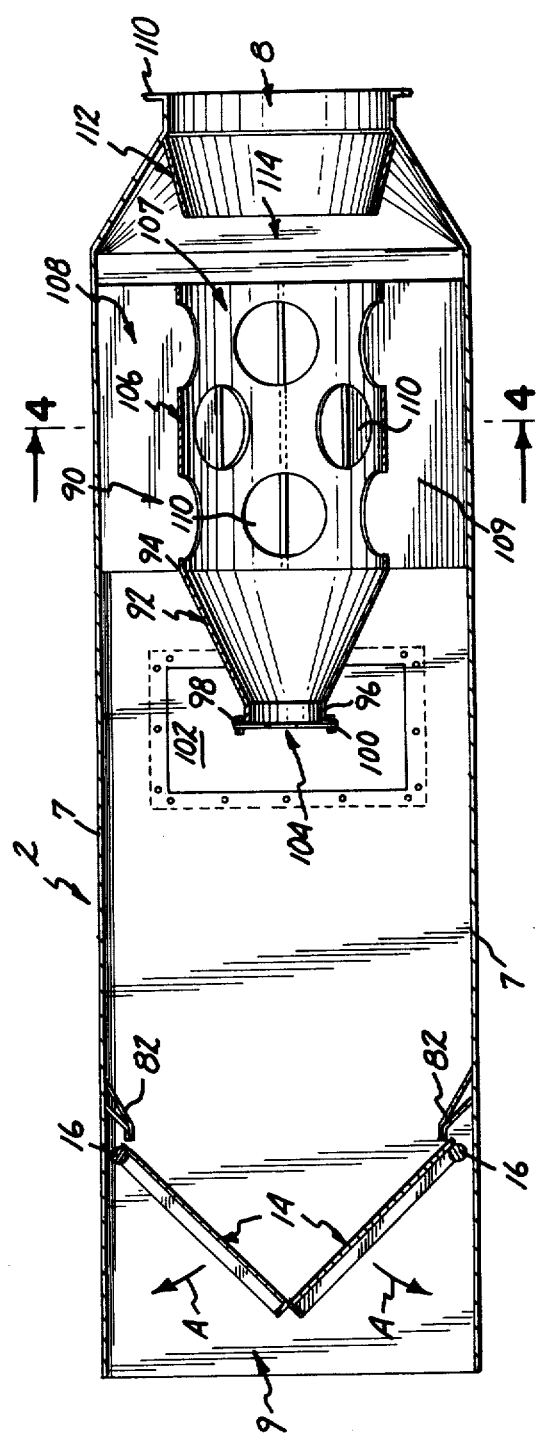
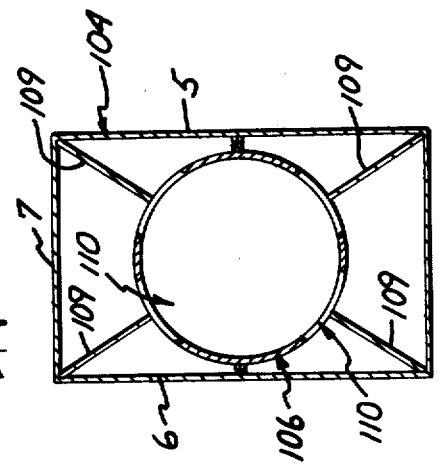
FIG. 3
FIG. 4

METHOD AND APPARATUS FOR DUST FREE GRAIN LOADING

This is a continuation of application Ser. No. 017,927, filed Mar. 6, 1979 now abandoned.

TECHNICAL FIELD

This invention relates generally to the loading of various types of particulate bulk materials. More particularly, this invention relates to devices for loading free flowing grain, other raw food products, or all granular and powdery materials into any suitable vehicle or storage device.

DESCRIPTION OF THE PRIOR ART

Grain and various other types of particulate bulk materials are customarily loaded into transport vehicles by downwardly inclined discharge chutes. The grain falls through the chute in a stream under the influence of gravity until it is deposited in a pile in the vehicle. However, grain or other bulk materials often contains a great deal of dust and other foreign matter which is entrained and carried with the grain particles. This dust is usually released into the air in billowing clouds when the downwardly falling grain stream impacts with the grain pile in the vehicle.

The release of dust during grain loading is disadvantageous for a number of reasons. First, the dust poses an environmental hazard as it pollutes the air and may be deleterious to the lungs of anyone who breathes this air. This requires that the workers who are exposed to the dust be protected by suitable respiratory masks or other protective breathing gear. However, this is not entirely satisfactoy since these masks can be expensive and are often not well liked by the workers, thereby discouraging extensive use of the masks. Furthermore, governmental regulations require that dust release be kept below certain minimum levels whether masks are worn or not. In addition, the dust release decreases visibility in the area surrounding the grain loading operation. This decrease in visibility can lead to increased accidents and the serious injuries which often result from such accidents. Thus, the dust also presents a safety problem.

Various devices have been proposed for eliminating the dust problem during grain loading by suppressing release of the dust from the grain. One such system is disclosed in German Pat. No. 2,627,535, which was issued on Dec. 22, 1977 to the assignee of the present invention. In this patent, a loading tube is disclosed as being attached to the end of a conventional grain discharge tube. The loading tube has a hinged flap type damper at the outlet opening thereof. This damper exerts a closure force on the grain passing therethrough. This closure force can be independently adjusted such that a column of material is built up inside the loading tube above the damper. In addition, the height of the outlet opening of the loading tube above the grain pile is kept within predetermined levels regardless of the height of the grain pile.

Grain loading systems such as those described above actually decrease the amount of dust which is released into the air during a grain loading operation. They accomplish this for two reasons. First, dust release is prevented by always keeping the outlet opening of the loading tube relatively close to the grain pile. Secondly, since a solid, vertical column of material is maintained above the damper, there is no opportunity for air to be mixed with the grain stream inside the housing. This further inhibits release of the dust.

Notwithstanding the improvements which are represented by the above-noted systems, such systems are not foolproof under all possible operating conditions. When the incoming bulk material stream has a high velocity, as when it has fallen from a great height, the known prior art systems still release a significant amount of dust into the air. This dust release may be postulated to occur for two reasons. First, the grain being discharged from the loading tube still has a sufficiently high velocity such that dust is released when it impacts with the grain pile. And, secondly, the high kinetic energy of the falling grain causes dust to be released inside the housing when the grain impacts with the column of material built up behind the damper. This dust then works its way outside of the housing and into the air.

Another type of device for the dust free loading of grain is "G-360 Nozzle" which is currently marketed by Delta International, Inc. of Memphis, Tenn. This nozzle first came to Applicant's attention after the development of the present invention. The G-360 Nozzle is meant for relatively low capacity grain loading flows, e.g. 6,500 bushels per hour (b.p.h.). It is shaped like a large vase and has a rotatable impeller mounted therein. The impeller apparently separates the dust from the grain and concentrates the dust in the center of the grain stream. A gate made of a plurality of overlapping urethane leaves is located at the outlet of the nozzle. A head of grain builds up above the gate until the gate opens to discharge the grain and maintain a constant grain head thereafter. In this regard, the gate of the G-360 Nozzle is similar to the damper of the prior art German patent noted above.

SUMMARY OF THE INVENTION

One aspect of this invention is a method and apparatus for the loading of grain which obviates some of the disadvantages of the prior art products noted above.

More particularly, this invention relates to an apparatus for loading grain which is relatively simple, inexpensive, and effective in suppressing dust release, even for relatively high velocity grain flows.

The loading apparatus of this invention includes a housing which is adapted to be attached to the output or discharge end of a grain discharge chute. A stream of grain will flow by gravity through the chute and into the housing in a generally downward path. The housing includes a shutoff means located adjacent to a material outlet opening of the housing. The shutoff means exerts an adjustable force on the grain stream. In addition, a retarding means is located in the path of the grain stream above the shutoff means. This retarding means absorbs a portion of the kinetic energy of the grain stream before the stream encounters the shutoff means. The retarding means in combination with the shutoff means insures that a major portion of the dust entrained in the grain is not released into the air upon discharge from the housing.

The improved method of this invention utilizes the above-noted apparatus. The method comprises the formation of two vertically elongated and spaced columns of grain in the housing. One column is formed by the retarding means and the other column by the shutoff means. Grain is discharged through the shutoff means at a rate such that the first and second grain columns are maintained during a grain loading operation.

BRIEF DESCRIPTION OF THE DRAWINGS

The present invention will be described hereafter in the Detailed Description, when taken in conjunction with the following drawings, in which like reference numerals refer to like elements throughout.

FIG. 3 is a cross-sectional view of the grain loading apparatus shown in FIG. 1, taken along lines 3—3 of FIG. 2;

FIG. 4 is a cross-sectional view of the grain loading apparatus shown in FIG. 1, taken along lines 4—4 of FIG. 3;

DETAILED DESCRIPTION

Figure 1:
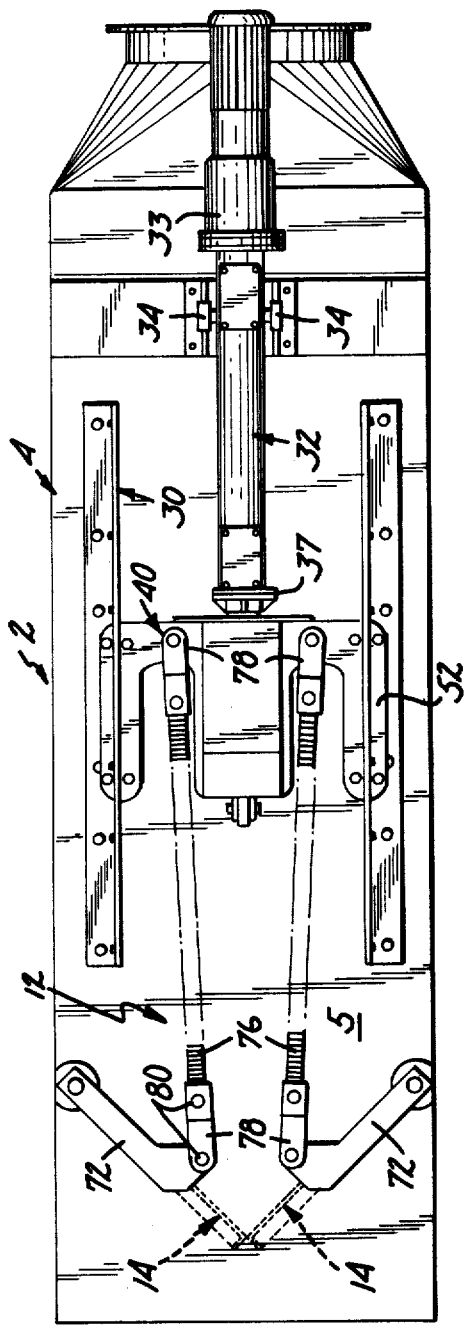
FIG. 1 is a top plan view of a first embodiment of a grain loading apparatus according to this invention.

Referring first to FIGS. 1-7, a first embodiment of an improved apparatus for the dust free loading of bulk materials, such as grain, is generally illustrated as 2. Loading apparatus 2 is primarily meant for use on the end of a vertical grain discharge chute (not shown). This discharge chute may be telescopic and may have various conventional structure associated with it for controlling the height of the chute above a grain pile. The chute forms no part of this invention and may be any conventional equipment used to gravity load grain or other types of particulate products. Loading apparatus 2 is particularly designed for the loading of any particulate bulk material which carry an appreciable amount of dust or other foreign matter therein. Thus, loading apparatus 2 is not limited for use with regard to any particular type of bulk materials.

Loading apparatus 2 includes a body or housing 4. Referring to FIG. 4, housing 4 is hollow and rectangular in cross-section having opposed top and bottom walls 5 and 6 joined together by side walls 7. In addition, housing 4 is longitudinally elongated and extends between a material inlet opening 8 and a material outlet opening 9. A mounting flange 10 is located at the material inlet opening 8. Flange 10 is used to bolt the housing 4 to the output end of the grain discharge chute or one or the telescopic sections of such a chute. In any event, loading apparatus 2 is designed to be located proximately to whatever device, such as a ship or railroad car, the grain is being loaded into. In this regard, the material outlet opening 9 will be kept quite close to the grain pile which is being formed. This is accomplished since the rain discharge chute is movable to ensure that the outlet opening 9 is kept close to the grain pile whatever its dimensions.

Loading apparatus 2 includes an adjustable valve or shut-off means for controlling the flow of the bulk material, e.g. grain, through the material outlet opening 9. This shut-off means is generally indicated as 12. Shut-off means 12 includes two major components: (1) a damper assembly located proximately to the outlet opening 9, and (2) actuator means for exerting an adjustable closure force on the damper assembly. The shut-off means 12 is for the purpose of ensuring that a tightly compacted grain stream is discharged through the outlet opening 9 through a column or head of the grain maintained thereabove. This will be described in more detail hereafter.

Figure 2:
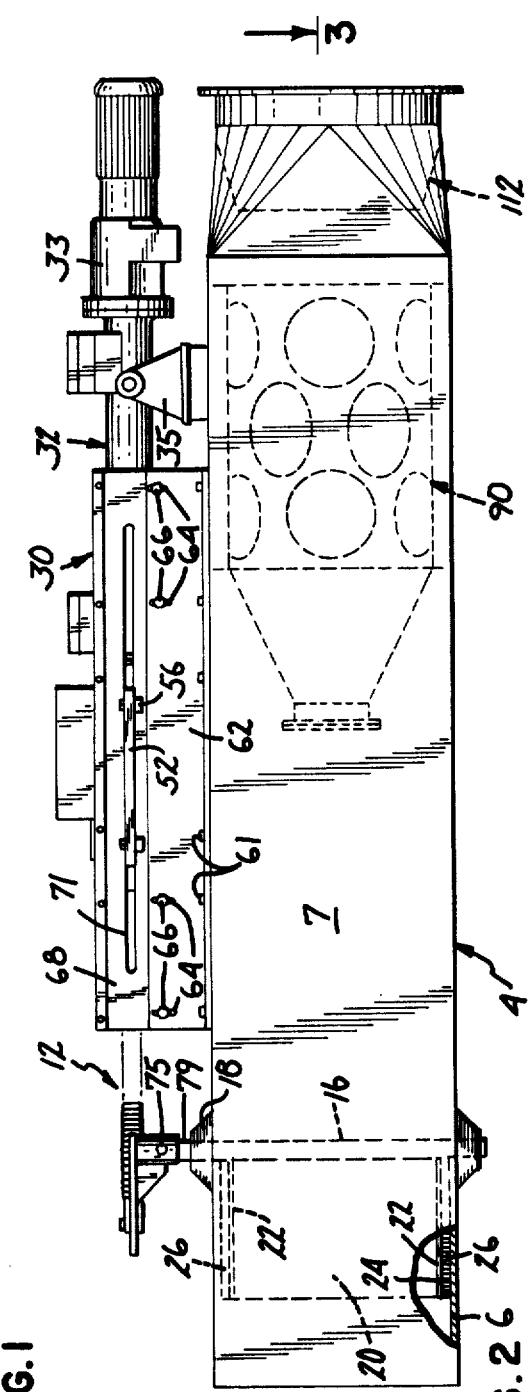
FIG. 2 is a side elevational view of the grain loading apparatus shown in FIG. 1.

Referring to FIGS. 1-3, the damper assembly of the shut-off means 12 comprises two pivotally mounted flap assemblies 14. Flap assemblies 14 are fixedly mounted on shafts 16 located adjacent each side wall 7 of the housing 4. Each flap assembly 14 is located proximately to, but sightly above, the material outlet opening 9 of housing 4. The location of flap assemblies 14 can be varied slightly as long as they form a flow controlling damper assembly located adjacent outlet opening 9. Shafts 16 are themselves rotatably mounted in two opposed ball bearing blocks 18 located on the top and bottom walls 5 and 6 of housing 4. The upper end of each shaft 16 extends above the top wall 5 of housing 4 to form a connecting rod indicated as 19 for connecting the flap assemblies to the actuator means 30.

Each flap assembly 14 comprises a substantially planar flap plate 20 fixedly connected at the top and bottom thereof to stiffener plates 22. Stiffener plates 22 have a plurality of apertures 24 therethrough. A bristle type brush assembly 26 extends outwardly from the top and bottom sides of each flap assembly 14, e.g. outwardly from the stiffener plates 22. A clamp plate (not shown) bears against each brush assembly 26 to removably hold the brush assembly 26 in place. A plurality of bolts or screws (not shown) extend through the apertures 24 and into the clamp plate for tightening the clamp plate against the brush assembly 26. Each brush assembly 26 contacts and wipes the inside surface of the top and bottom walls 5 and 6 of housing 4 for a purpose to be described hereafter.

An actuator means generally indicated as 30 is provided for exerting a predetermined retarding or closure force on each of the flap assemblies 14. In this regard, the flap assemblies 14 are shown in FIGS. 1 and 3 in a closed flow obstructing position. In this position, the inner ends of the flap assemblies 14 abut against one another to block any material flow through outlet opening 9. However, as shown in FIG. 3, the flap assemblies 14 may be rotated as shown by the arrows A to at least a partially open position for allowing grain to flow therethrough. The force which is required to rotate the flap assemblies may be quickly and easily set through actuator means 30.

Figure 6:
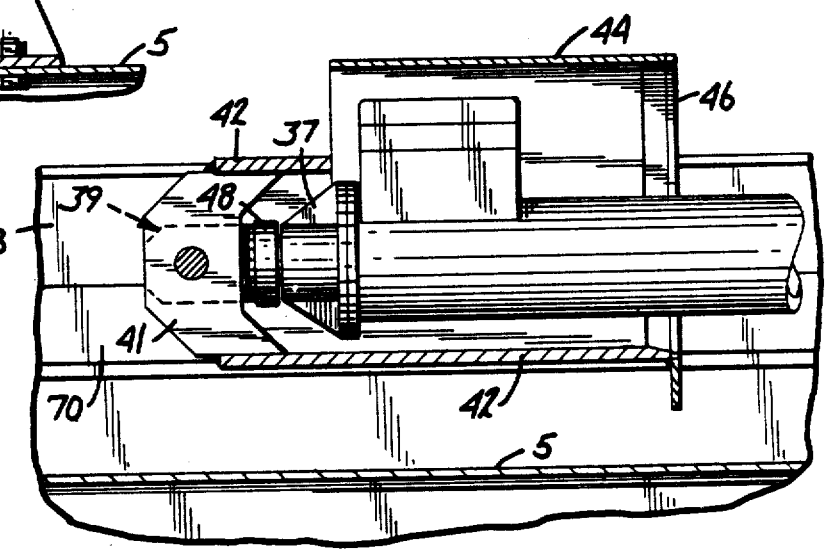
FIG. 6 is a partial cross-sectional view of the grain loading apparatus shown in FIG. 1, taken along lines 6—6 in FIG. 5.

Actuator means 30 includes any standard electric linear actuator 32. Actuator 32 comprises a suitably electric drive motor 33. Drive motor 33 is connected to a suitable source of electric power and various control means are provided for controlling its operation. The casing of actuator 32 has outwardly protruding trunnions 34 which engage on suitable trunnion brackets 35 on the top wall 5 of housing 4. Actuator 32 is oriented to extend down the centerline of housing 4. Actuator 32 includes an elongated threaded actuator rod 38 which is contained inside the casing and is operated by a nut 37 driven by drive motor 33. Rotation of nut 37 causes the rod 38 to extend inwardly and outwardly relative to the actuator casing. Referring to FIG. 6, the front end of rod 38 forms a clevis 39. Clevis 39 is connected to a clevis bracket 41 which forms part of a connecting yoke generally indicated as 40.

Connecting yoke 40 includes a substantially circular front pipe section 42. Clevis bracket 41 is fixedly mounted, as by welding, in a vertical orientation along a diameter of the pipe section 42. The top half of pipe section 42 is cut away over the majority of its length in back of clevis bracket 41. This enables an enlarged U-shaped cover plate 44 to replace the cut away top half of pipe section 42. Cover plate 44 provides operating clearance to the front part of the linear actuator 32 as shown in the drawings. An end plate 46 is a stiffener between the rear side of cover plate 44 and the pipe section 42 structure. This end plate 46 has an opening for providing operating clearance to the linear actuator 32.

In addition, connecting yoke 40 includes two, substantially horizontal, outwardly extending brackets 50 which are fixedly connected to each side of pipe section 42. Brackets 50 each include a longitudinally extending elongated arm 52. Arm 52 has two pairs of adjacent angled slots 54 with each pair of slots being located adjacent one end of the arm 52. See FIG. 5. Each slot 54 rotatably journals a cam follower roller 56 beneath the arm 52. Cam followers 56 are rotatably mounted on a shaft or bolt 58 passing through slot 54 which is held in place by a nut 59. The cam followers 56 are disposed in opposed pairs by virtue of slots 54. The location of each cam follower 56 can be adjusted in the angled slot until the rollers 56 in each pair are located on and engage with the opposite sides of a guide bar 68 for the connecting yoke 40. The cam followers 56 insure that yoke 40 slides smoothly relatively to guide bar 68 because of the roller construction thereof.

Figure 5:
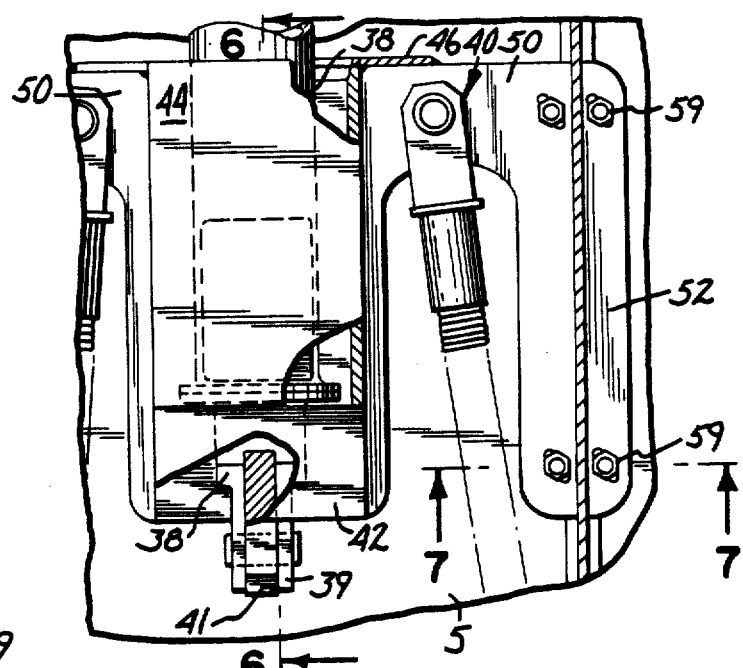
FIG. 5 is a partial top plan view of the grain loading apparatus shown in FIG. 1, particularly illustrating a portion of the actuator means for the flap assemblies.
Figure 7:
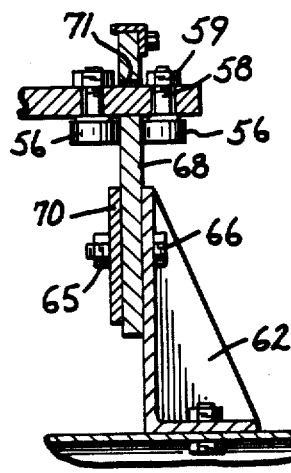
FIG. 7 is a partial cross-sectional view of the grain loading apparatus shown in FIG. 1, taken along lines 7—7 in FIG. 5.

Referring now to FIGS. 1, 2, and 5, two opposed longitudinal guide members, each generally indicated as 60, are located on the top wall 5 of housing 4 for coaction with connecting yoke 40. Each guide member 60 includes an L-shaped elongated guide bracket 62 secured to top wall 5 by bolts 61 or any other suitable fasteners. Guide brackets 62 are generally parallel to the actuator 32. Each guide bracket 62 has a plurality of vertically elongated slots 64 in the vertical wall of guide bracket 62. An elongated guide bar 68 is connected to the top end of guide bracket 62 by bolts 66 which pass through the slots 64. The vertical location of the guide bar 68 relative to the guide bracket 62 can be adjusted by virtue of the elongated slots 64. A backing bar 70 is located in back of the guide bar 68 and serves as a bearing plate for the nuts 65 on the outer end of bolts 66. Each guide bar 68 includes a horizontally elongated slot 71 located at the vertical location of yoke 40. Each arm 52 of the connecting yoke 40 extends through one of the slots 71 with the opposed cam followers 56 in each pair being located on either side of the guide bar 68.

Finally, referring to FIGS. 1 and 2, actuator means 30 includes a lever arm 72 connected to the connecting rod portions 19, i.e. the top end, of each shaft 16. Lever arm 72 has a downwardly extending collar 73 which is fixed by screws 75 or the like to the top end of shaft 16. Two elongated tension springs 76 are connected between the lever arms 72 and the connecting yoke 40 by identical clevis connections 78. Clevis connections 78 are pinned by pins 80 at one end to the lever arm 72 or one of the brackets 50 of connecting yoke 40 and at the other end to the springs 76. In addition, deflector plates 82 may be mounted on the side walls 7 of housing 4 adjacent the shafts 16. Deflector plates 82 serve to deflect grain around the shafts 16 to prevent any possible spilling of grain or dust into the outlet opening 9.

In addition to the shutoff means 12, the loading apparatus 2 includes means located inside housing 4 above shutoff means 12 to retarding the flow of grain therethrough. The grain retarding means, generally indicated as 90 in FIG. 3, is mounted in the upper end of housing 4. Retarding means 90 includes a grain retarding cone 92. Cone 92 is truncated and inverted having an open upper end 94 and an open apex end 96 which defines an outlet opening for the cone. The cone outlet opening 96 includes an outwardly extending flange 98. A plurality of different flow restriction plates 100 can be releasably mounted on flange 98 by bolts or the like. In this regard, a removable access cover 102 is contained in housing 4 for allowing access to the flange 98 for the purpose of installing or changing the flow restriction plate 100. Each flow restriction plate 100 has a differently sized circular opening 104 therein, e.g. openings of 4", 6", or 8" in diameter. Thus, the size of the outlet opening 96 in cone 92 can be effectively varied by changing the flow restriction plate 100. In some cases, the flow restriction plate 100 is solid, such that no outlet opening 96 is then provided in cone 92.

In addition, grain retarding means 90 includes a hollow, vertically elongated cylinder indicated as 106. Cylinder 106 is attached as by welding to the open upper end 94 of cone 92 and extends upwardly therefrom. Cylinder 106 has an open upper end 107 which allows grain to fall downwardly therethrough to engage cone 92. Cylinder 106 is not as large as housing 4 and is spaced from the walls of the housing 4 to define an annular grain discharge chamber 108. A plurality of supports or braces 109 are welded to the cylinder 106 and to the various walls of housing 4 to fix the location of grain retarding means 90 in the housing 4 above the flap assemblies 14. In addition, cylinder 106 includes a plurality of spaced openings or perforations 110 located around its entire surface. Perforations 110 allow grain to be discharged from a column of grain confined in cylinder 106 into the discharge chamber 108.

Mounted immediately above the grain retarding means 90 is a second inverted cone 112. Cone 112 is also truncated and is mounted in the grain inlet opening 8 of housing 4. The outlet 114 of cone 112 is closely adjacent to and the same size as the open top end of cylinder 106. The purpose of cone 112 will be described in more detail hereafter.

Referring now to the operation of loading apparatus 2, it will be assumed that apparatus 2 is installed on the end of a vertical grain discharge chute. Grain then falls by gravity through the chute until it engages the cone 112. Cone 112 compacts, i.e. narrows the lateral width, of the stream of grain. In addition, the cone 112 directs that stream of grain down the centerline of the grain retarding means 90.

As the grain flows downwardly into retarding means 90, it passes through cylinder 106 until it engages the angled side surfaces of cone 92 and encounters the restriction formed by the outlet opening 104 in flow restriction plate 100. This restriction and the cone 92 serves as a fixed grain impacting surface on which the downwardly falling grain impacts and dissipates much of its kinetic energy. Because the grain cannot flow through the outlet opening 104 in the flow restriction plate 100 as fast as it is approaching the plate 100, a column or "head" of material builds up in cone 92.

Depending on the flow conditions this column eventually extends up into the cylinder 106. Cylinder 106 confines and contains the upwardly directed column of material. However, the grain overflow in cylinder 106 eventually flows out through the perforations 110 and falls down through the grain discharge chamber 108 around the exterior of the cylinder 106. In such a flow condition, grain is then passed both through the flow restriction plate 100 and around the outside of cone 106 with its flow having a substantially reduced level of kinetic energy. If a solid flow restriction plate 100 is used, grain will be discharged only through the grain discharge chamber 108. The height of the column of material built up inside the grain retarding means 90 will depend upon the incoming velocity and the type of grain being loaded as well as the size of the opening 104 in flow restriction plate 100.

After passing downwardly from the grain retarding means 90, the grain then engages the pivotally mounted flap assemblies 14 of shutoff means 12. These flap assemblies 14 have a predetermined closure force determined by the force exerted by the springs 76. A second column or "head" of material will begin to build up behind the flap assemblies 14. However, at some point the weight of this column of material will open the flap assemblies 14. Grain will then pour out through the outlet opening 9 in a compated and tightly centralized stream. In addition, the dual flap assemblies 14 ensure that the weight of the grain stream will be concentrated more in the center of housing 4 as opposed to that encounted with the flap type dampers of the prior art. The length of the column of material will of course depend upon the closure force on the flap assemblies 14 and the degree of kinetic energy still left in the grain steam after it departs retarding means 90.

The closure force exerted by the springs 76 can be adjusted as necessary simply by moving the connecting yoke 40 relative to their supporting guide bars 68. This changes the amount of preloading on the springs 76 and, thus, the force exerted by the springs on the flap assemblies 14 which tends to close the flap assemblies. Movement of the connecting yoke 40 is achieved by actuating the linear actuator 32 causing the actuator rod 38 to extend or be withdrawn. The actuator can be automatically operated in a feedback manner. Suitable controls can sense the height of the column behind the flap assemblies and adjust the tension of springs 76 as necessary to keep the height of the column within predetermined limits. In addition, brush assemblies 26 are advantageous. These assemblies 26 wipe the top and bottom walls 5 and 6 of housing 4 with little or no friction. They also confine any released dust inside housing 4 and prevent that dust from escaping around the flap assemblies into the atmosphere.

It has been found by Applicant that the loading device 2 as described above has numerous advantages. The use of a controllable damper on the end of a grain loading tube for suppressing dust has been known previously as described in the Description of Prior Art. However, the use of such a shutoff means in conjunction with the grain retarding means 90 of this invention has been found to yield superior results in the dust free loading of grain. In other words, this combination substantially eliminates dusting or dust release during grain loading when the proper sized flow restriction plate 100 is used in retarding means 90 along with the proper amount of closure force on the flap assemblies 14. It is postulated by Applicant that the invention is effective in dust suppression by reason of the grain retarding means 90 which absorbs a substantial portion of the kinetic energy of the grain stream. Thus, this stream will no longer impact on the flap assemblies 14 with as much force, thereby decreasing the amount of dust released inside the housing adjacent the outlet opening 9. This dust would otherwise be able to work its way out into the atmosphere. Since the grain stream has been slowed, the flow at the flap assemblies 14 can be more easily and precisely controlled to achieve a steady state and tightly compacted grain discharge. It is preferable to use the shutoff means 12 to precisely regulate the flow through outlet opening 9 and to prevent a dusting problem from arising at the very outlet end of the loading apparatus 2.

Figures 8, 9:
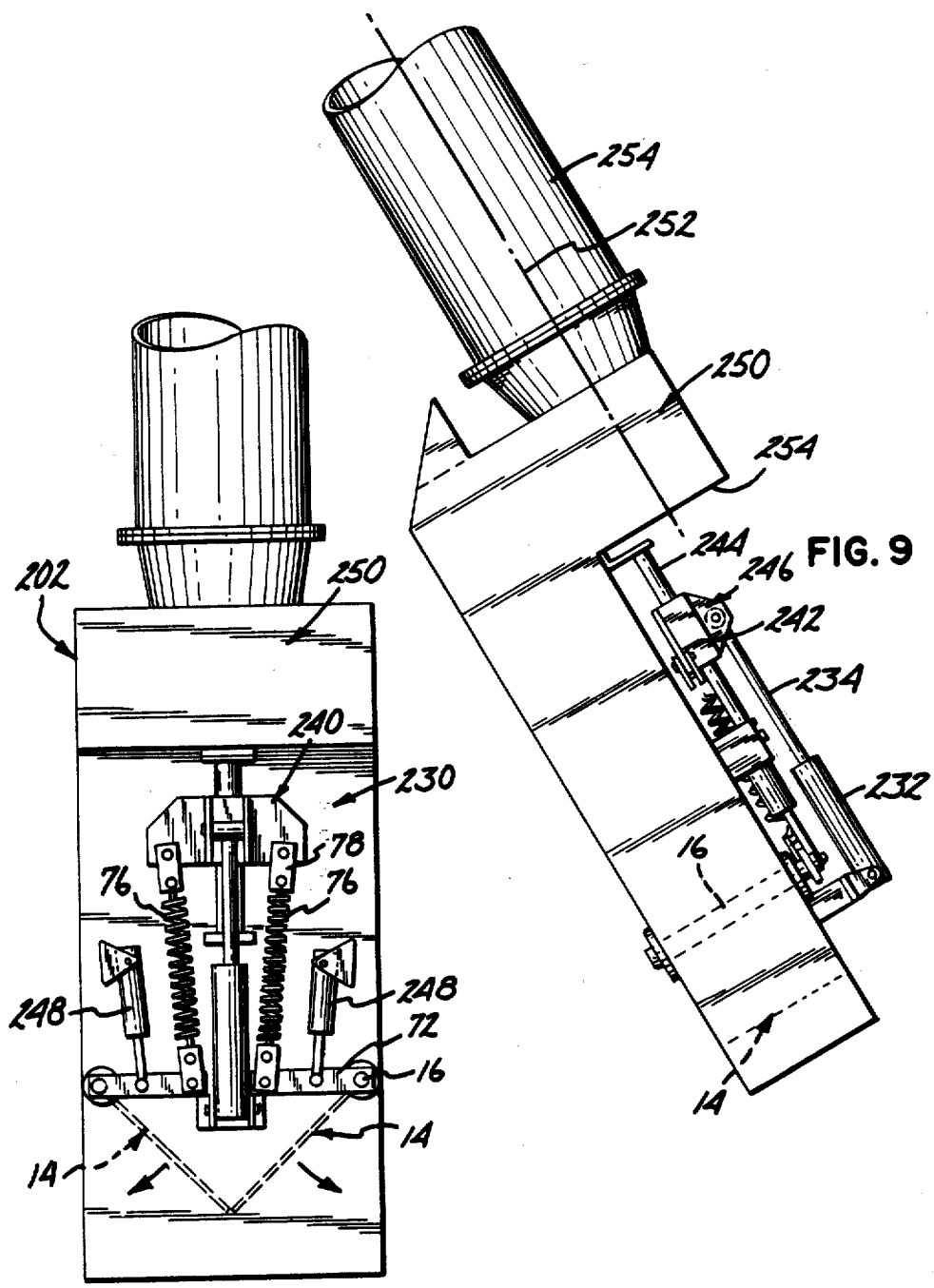
FIG. 8 is a top plan view of a second embodiment of a grain loading apparatus according to this invention.
FIG. 9 is a side elevational view of the grain loading apparatus shown in FIG. 8.

A second embodiment of a grain loading apparatus according to the present invention is shown more particularly as 202 in FIGS. 8 and 9. Elements of loading apparatus 202 which are identical to those in apparatus 2 will have identical reference numerals to those used in FIGS. 1–7. In loading apparatus 202, the flap assemblies 14 have a similar actuator means shown as 230. Electric operated linear actuator means 230 has an extensible and retractable piston rod 234. The piston rod 234 is attached to a connecting yoke 240. Yoke 240 has a collar 242 which is slidable on an elongated guide rod 244. The springs 76 are connected between the yoke 240 and the lever arms 72 of the flap assemblies 14. These springs 76 thus serve to preload the flap assemblies 14 with a predetermined closure force. The amount of preloading can be changed by moving the yoke 240 on rod 244 by actuating cylinder 232. Two shock absorbers 248 or oscillation dampers are connected between the top wall 5 of housing 4 and the respective lever arms 72. Shock absorbers 248 dampen out any undesirable oscillations in the movement of the flap assemblies 14 occasioned by irregularities in the grain flow through the apparatus 202.

A different type of grain retarding means is shown in loading apparatus 202 above the flap assemblies 14. This retarding means comprises a portion or section of the housing 4, generally indicated as 250, which extends transversely to a longitudinal axis 252 through the grain discharge chute 254. Preferably, this section 250 extends at right angels to the axis 252 to define a grain impact surface 254 on which the downwardly falling grain stream impacts to have a substantial protion of its kinetic energy dissipated. Housing section 250 forms in effect a "deadbox". Housing section 250 need not necessarily be at right angles to the axis 252, as long as it extends at least partially transversely to the axis at such an angle as to offer an appreciable obstruction to the flow of grain through housing 4. Thus, the necessary column of material will build up in the housing 4 above the grain impact surface 254 in the same way as is true with respect to grain retarding means 90. However, grain will continue to flow out of housing section 250 and down through the rest of the housing 4 until it engages flap assemblies 14, albeit with a reduced level of kinetic energy.

The embodiment 202 of FIGS. 8 and 9 can be used only with respect to inclined or tilted grain discharge chutes. This embodiment will not function properly when the grain discharge chute is strictly vertical since the grain will tend to build up in the chute 254 without flowing out of the deadbox housing section 250. That is the reason why the embodiment of FIGS. 1–7 is necessary for vertical spouts. Since the grain retarding means 90 is in line with the discharge chute and has a different structure, this embodiment will work satisfactorily when the chute is vertical. In all other regards, however, the loading apparatus 202 works similarly to apparatus 2, by forming two spaced columns of material in housing 4 with one column being formed at the retarding means and the other column being the flap assemblies.

Various modifications of this invention will be apparent to those skilled in the art. For example, various protective tubing or other protective structure can be attached to the top wall 5 of the housing for protecting the actuator means 30 from damage. Thus, the scope of this invention is to be limited only by the appended claims.

I claim:

1. An improved apparatus for the dust free loading of bulk materials of the type which includes a housing adapted to be attached to the output end of a discharge chute through which a stream of bulk material flows by gravity in a downward path, and which also includes a shutoff means located adjacent to a material outlet opening of the housing for imparting an adjustable force on the bulk material stream, and wherein the improvement comprises:

retarding means carried with the housing and located in the path of the bulk material stream above the shutoff means for absorbing a portion of the kinetic energy thereof, whereby release of dust is substantially suppressed during discharge of the bulk material stream from the housing, and wherein the retarding means comprises:

(a) a hollow inverted cone mounted inside the housing for contacting and slowing the bulk material stream to form a vertical column of the bulk material, the cone having an outlet opening for allowing a limited amount of the bulk material stream to flow therethrough; and (b) a hollow, perforated tube attached to the cone and extending upwardly therefrom for confining the bulk material column, wherein the tube is smaller than the housing to define a discharge chamber for the bulk material column, whereby the remaining amount of the bulk material stream contained in the bulk material column is discharged through the perforations in the tube into the chamber.

2. An improved apparatus as recited in claim 1 wherein the size of the cone outlet opening is adjustable.

3. An improved apparatus as recited in claim 1, further including means for closing the cone outlet opening so that all of the bulk material stream is discharged through the perforations in the tube.

* * * * *